US006892946B2

(12) United States Patent
Massen et al.

(10) Patent No.: US 6,892,946 B2
(45) Date of Patent: May 17, 2005

(54) DEVICE FOR VERIFYING DOCUMENTS

(75) Inventors: Robert Massen, Öhningen (DE); Thomas Franz, Constance (DE); Thomas Leitner, Constance (DE); Jörg Eberhardt, Tettnang (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 10/305,476

(22) Filed: Nov. 27, 2002

(65) Prior Publication Data

US 2003/0156274 A1 Aug. 21, 2003

Related U.S. Application Data

(63) Continuation of application No. PCT/EP01/05990, filed on May 25, 2001.

(30) Foreign Application Priority Data

Jun. 7, 2000 (DE) ........................................ 100 28 241

(51) Int. Cl.[7] .................................................. G06K 7/10
(52) U.S. Cl. .................................. 235/454; 235/462.43
(58) Field of Search ................................ 235/454, 459, 235/462.43, 469

(56) References Cited

U.S. PATENT DOCUMENTS

| | | | | |
|---|---|---|---|---|
| 4,561,061 A | | 12/1985 | Sakamoto et al. | 364/550 |
| 4,751,375 A | * | 6/1988 | Ravizza | 235/472.01 |
| 5,280,370 A | | 1/1994 | Faust et al. | 358/488 |
| 5,306,899 A | * | 4/1994 | Marom et al. | 235/382 |
| 5,363,454 A | * | 11/1994 | Udagawa et al. | 382/165 |
| 5,401,960 A | * | 3/1995 | Fisun et al. | 250/271 |
| 5,424,807 A | | 6/1995 | Ohmura | 355/201 |
| 5,650,863 A | | 7/1997 | Utagawa et al. | 358/475 |
| 5,900,954 A | * | 5/1999 | Katz et al. | 359/2 |
| 5,960,103 A | | 9/1999 | Graves et al. | 382/135 |
| 5,971,276 A | * | 10/1999 | Sano et al. | 235/462.01 |
| 6,123,263 A | * | 9/2000 | Feng | 235/462.42 |
| 6,168,081 B1 | * | 1/2001 | Urano et al. | 235/462.27 |
| 6,354,501 B1 | * | 3/2002 | Outwater et al. | 235/462.01 |

FOREIGN PATENT DOCUMENTS

| | | | |
|---|---|---|---|
| DE | 32 12 096 | 10/1982 | G03F/1/04 |
| DE | 39 30 290 | 3/1991 | G06K/9/20 |
| EP | 0 101 115 | 2/1984 | G07D/7/00 |
| EP | 0 522 769 | 1/1993 | H04N/1/00 |
| EP | 987669 A1 * | 3/2000 | G08F/3/00 |
| WO | 95/12860 | 5/1995 | G06K/7/10 |

* cited by examiner

*Primary Examiner*—Diane I. Lee
(74) *Attorney, Agent, or Firm*—Darby & Darby

(57) ABSTRACT

A document-examining apparatus is provided for automatically examining the authenticity elements of secured documents. It includes a compound slide which can be moved in the X and Y directions and on which the components required to evaluate the distinguishing authenticity features are mounted. The X slide of the compound slide is mounted on a Y slide. A first group of evaluating units for evaluating diffraction elements on a document is disposed on the X slide. A second group of evaluating components, for example, for evaluating text, an IR field and/or a photographic field, may be mounted on the Y slide. In addition, a source of UV radiation may be provided for examining distinguishing fluorescence features of a document, the fluorescence being evaluated by a stationary evaluating unit or by the evaluating unit on the X slide.

9 Claims, 6 Drawing Sheets

DEVICE FOR VERIFYING DOCUMENTS

This application is a continuation of international application Ser. No. PCT/EPO1/05990, filed May 25, 2001, which was published in German.

This invention relates to apparatus for automatically examining documents for the purpose of determining authenticity.

BACKGROUND OF THE INVENTION

There are many different types of documents and things which are subject to counterfeiting or forgery, and many different techniques and devices have been developed for determining the authenticity of a document or thing. By way of example only, such documents include bank notes, identification papers, passports, drivers licenses, visas, admission tickets and stock certificates. As used herein, the term "secured document" includes any document or thing which is provided with a distinguishing authenticity element (whether printed or not) which can be used to authenticate, identify or classify the document. The term "authentication element" is intended to refer to any "device" which may be printed on, or otherwise attached to, a secured document for the purpose of authenticating the document or for the purpose of determining its value and/or type or any other characteristic. Likewise, "authenticity" is meant to encompass value, type or other characteristic of a secured document as well as the genuineness of the document.

There are machines which automatically examine authentication elements on a multiplicity of secured documents. In one known machine, the secured document is supported on a transparent supporting surface and illuminated from below by a fixed light source. The reflected image is captured by a stationary camera (typically, one or more matrix cameras) and the image evaluated with appropriate software. Such devices have relatively low resolution and, though suitable for reading text within the document, are not suitable for reading a two dimensional bar code or authenticity elements which are based on diffraction or which are hidden steganographically in parts of the image.

Authentication elements are known which operate on principles of light diffraction. With diffraction systems, a light source (typically a laser) illuminates a diffraction element (e.g., a hologram) to produce a diffraction pattern that can be sensed and evaluated to determine authenticity. In known devices of this type, the laser and associated evaluating unit are housed in a hand held unit which can be placed by hand on the authenticity element which can be recognized with the naked eye. Heretofore, such authenticity evaluating units have not been incorporated into machines which are used for automatically examining documents.

Automatic document-examining machines are known which include a flat bed scanner having a slide movable in the Y direction on which an illuminating device and camera are mounted. The camera records the image produced by the illuminated document and evaluates it; however, such flat bed scanners are not suitable for automatically examining authenticity elements which are based on diffraction principals wherein laser illumination is required. Moreover, flatbed scanners are not suitable for identifying special elements on a document which must be illuminated with different sources of illumination.

It is a principal object of the invention to provide a document-examining machine of the type described wherein distinguishing authenticity elements can be examined rapidly and accurately.

A more specific object is to provide a document-examining machine which can be used to automatically examine authenticity elements based on diffraction principals reliably and satisfactorily.

SUMMARY OF THE INVENTION

In accordance with the invention, a machine for automatically examining secured documents includes a compound slide which is movable in both the X and Y directions. The components required to evaluate the authenticity elements are disposed on the compound slide. The compound slide includes a slide which is movable in the X direction mounted on a slide which is movable in the Y direction. The units for evaluating the diffraction pattern are mounted on the X slide whereas the other components used for evaluating text (for example) are mounted on the Y slide.

With this arrangement, it is possible to identify the authenticity element in situ directly with high resolution and accuracy. Because the evaluating unit can be positioned in both X and Y directions, it is possible to compensate for errors in the position of the authenticity element on the secured document. For example, if a document has been produced with the authenticity element displaced by several millimeters, the XY slide can be positioned so that the evaluating unit is directly below the authenticity element.

Preferably, the unit for evaluating the diffraction patterns consists of a laser and appropriate optical evaluating system, all of which are mounted on the X slide which can be moved in both X and Y directions. With this arrangement, it is possible to move the entire evaluation unit (i.e. the laser and associated optical unit) and position it accurately under the distinguishing authenticity element of the secured document. Other optical evaluating components, for example, used to evaluate text, an IR field and/or a photographic field are preferably mounted on the Y slide and, therefore, can be moved only in the Y direction. These components can be used to scan the document accurately over its entire width on a line by line basis with a single scan in the Y direction.

It is further contemplated that an illuminating unit may be mounted on the Y slide although this is not essential because one or more illumination units may also be disposed outside of the XY slide in order to illuminate the document. However, if the illuminating unit is mounted on the slide and consists of at least one illuminating line, when the Y slide is scanned relative to the document, the illuminating line produces a scanning line on the document over the entire width of the document. This scanning line may be directed by an appropriate mirror system onto an OCR matrix camera for evaluation.

As a further embellishment of the invention, the document-examining device may include a stationary evaluating unit for distinguishing fluorescent features of the document. For this purpose, a stationary camera mounted in the housing of the device is directed at a mirror which images the supporting surface on which the document is resting. The supporting surface is illuminated in the UV range with a suitable source of UV illumination so that the authenticity elements of the document are stimulated to fluorescence and emit light which is directed by the mirror onto the stationary camera. This evaluating unit is thus completely independent of the X-Y slide.

In a different version of this evaluating unit, the stationary UV camera is omitted; instead, the camera used for the laser evaluation on the X slide is also used at the same time for evaluating the UV image.

Two cameras, separated from one another, can also be mounted on the X slide, one of which is suitable for the laser evaluation of diffraction elements, while the other camera is intended for evaluating the UV image.

The invention is not limited to evaluation in the UV range; this depends, in particular, on the nature of the filters used and on the type of illumination employed. All evaluations can also take place in a different region of the spectrum; in particular, instead of the UV filters, it is also possible to use polarization filters. Completely different wavelength regions can be used as well. For example, the wavelength range of the NIR (near infrared) or any other wavelength range can be used. Any mention of a UV evaluation in this specification is to be regarded only as exemplary.

The use of an X-Y slide with the laser evaluating unit mounted in the X slide has the significant advantage that the laser unit is well protected against a loss of adjustment.

It is possible to use a stationary laser which beams onto an opposing mirror, the reflection of which is imaged on an evaluating unit disposed in a slide so that it can be moved. This, however, has the disadvantage that the beam path between the stationary laser and the oppositely disposed mirror is long, so that the arrangement as a whole loses adjustment easily. Such a device is very sensitive to shocks which cause it to lose adjustment, after which it can only be adjusted with difficulty.

In accordance with the invention, the entire evaluating unit (laser, mirror and associated camera with lens) is disposed in a very tight space on an (inner) slide, which can be moved in X and Y directions. As a result, the whole unit is protected against shocks, because the beam path between the laser unit and the evaluating unit is short.

During transport, the whole X-Y slide can easily be secured (locked), as a result of which the guides, in which the X-Y slide is guided, are also protected and secured against deflection.

The invention also relates to the kinematic reversal of an X-Y slide. The slide movable in the X direction may be an inner slide, and the slide movable in the Y direction an outer slide which can be moved along the document. In a kinematic reversal, the inner slide can be moved in the Y direction and the outer slide in the X direction.

The aforementioned X-Y slide or Y-X slide can also be replaced by other position systems, which can be positioned in two planes. Provisions are therefore made that all the evaluating components can be moved freely in space in two directions perpendicular to one another. This can be accomplished by spindle drives, by electric motor drives, or by electromagnetic drives. Such systems, which can be positioned freely in the X-Y plane, are known. They employ hydraulic or pneumatic cylinders, or spindles driven by an electric motor or the like.

THE DRAWINGS

FIG. 1 diagrammatically shows a section through a document-examining device according to a preferred embodiment of the invention;

DETAILED DESCRIPTION

Figure 1:
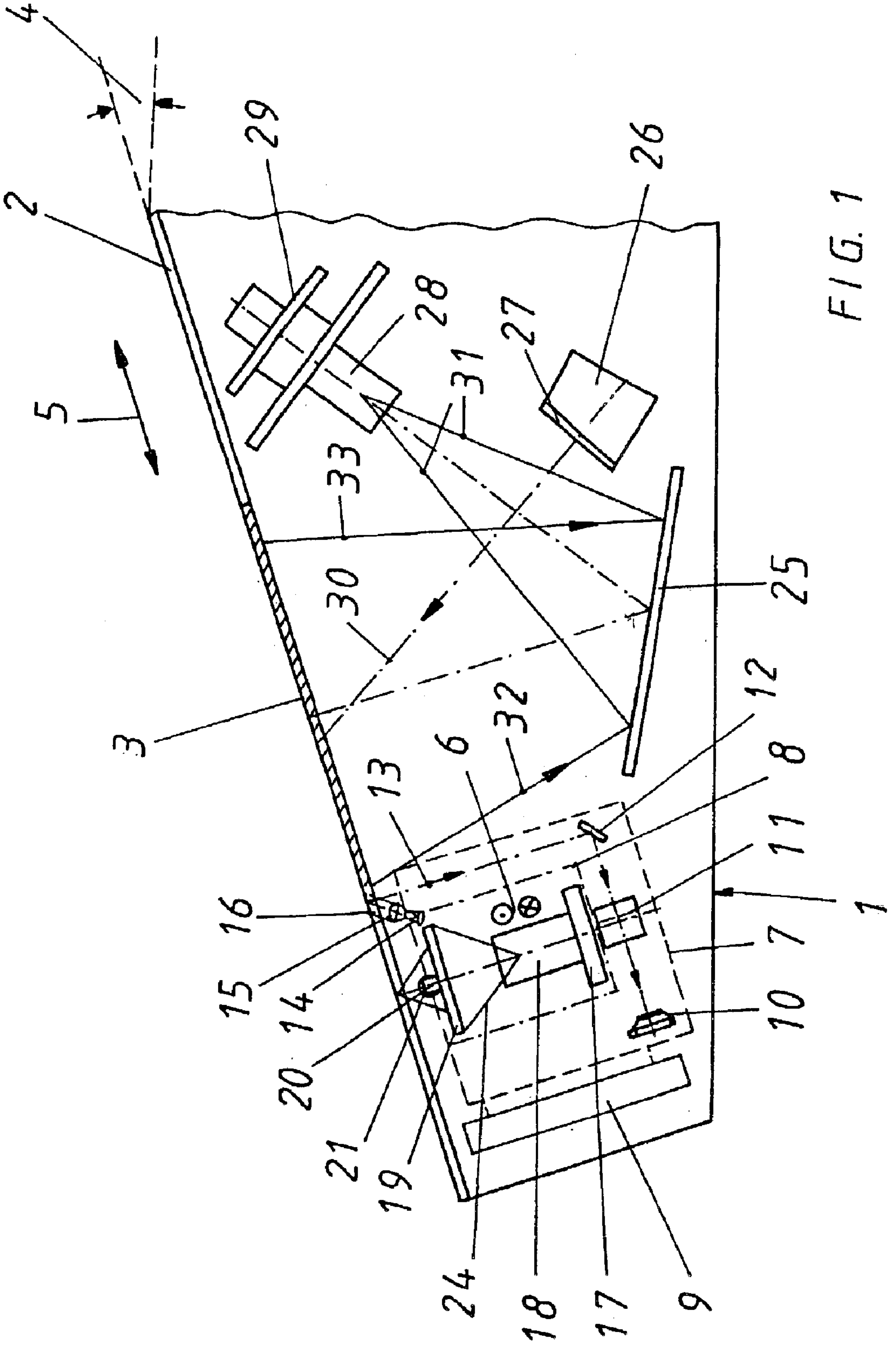

In FIG. 1, the housing 1 of a document-examining device is shown. The housing is a desk-like construction and has a front plate 2 which is inclined at an angle 4 to the horizontal and within which a transparent supporting surface 3 (for example, glass) is disposed. The document to be examined is placed on the supporting surface and pressed against it with a defined pressure so that the document surface which is to be examined is visible from the underside of the supporting surface 3.

According to the invention, an X-Y slide 7, 8 is movably mounted in slide guides which are described below. The Y slide 7 is movable in the Y direction of arrow 5 and the X slide is movable in the direction of arrow 6 (namely, transverse to the plane of the drawing of FIG. 1).

It is preferred that the outer Y slide 7 carries the less sensitive evaluating components comprising an illuminating unit 14 which is inclined at an angle to the direction of the plane of front plate 2 in front of a focusing lens 15. The illuminating unit 14 and focusing lens are preferably linear devices with the light from illuminating unit 14 focused by lens 15 onto the underside of the document resting on the supporting surface 3. Preferably, the illuminating unit 14 consists of a linear array of LEDs (see FIG. 6) and produce white light. However, other illuminating units may also be used, such as an illuminating unit in which LEDs are provided, one portion of which radiates white light and the other IR light. Several illuminating units 14 may be disposed side by side or above one another, and each illuminating unit may generate a separate spectrum or a mixed spectrum.

The light reflected by the illuminating unit from the underside of the document is passed over the beam path 13 onto a tilted mirror 12 and directed through a lens 11 onto a line camera 10, which is suitable for evaluating the text of a document or other image information or hidden information, which, for example, can be read only in the NIR range.

A signal processor in the shape of a plate 9 evaluates the images received by camera 10, and is fastened to the Y slide 7. This arrangement ensures that the information paths and the cable lengths are short; therefore, the arrangement as a whole is not highly susceptible to interference.

Figure 3:
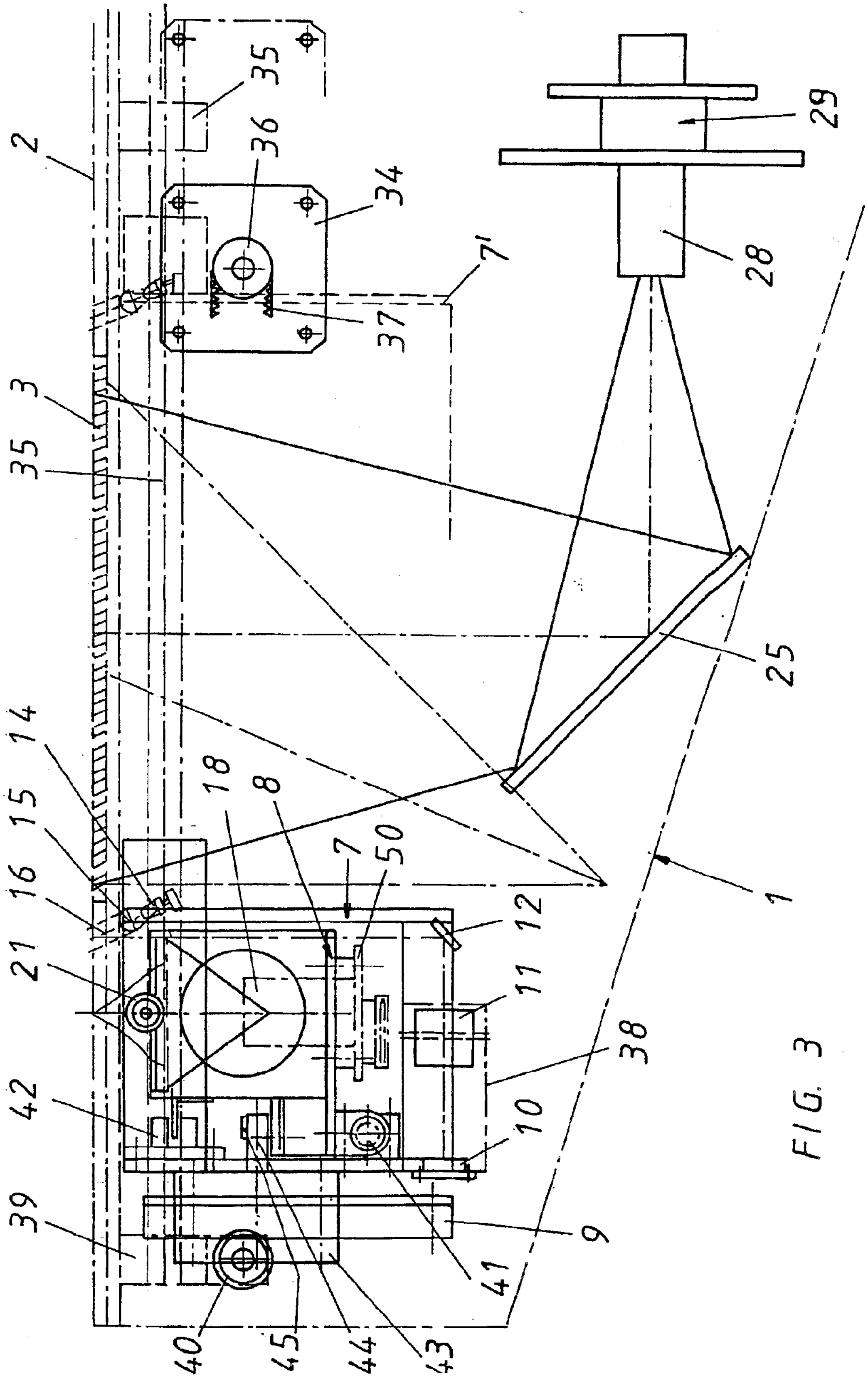
FIG. 3 shows a section through the device, further details being shown.

By comparing FIGS. 1 and 3, it can be seen that the direction of the beam path 16 may differ. In FIG. 1, the beam path 16 is inclined towards the front in the direction of the supporting surface 3, and in FIG. 3 it is inclined towards the rear.

The arrangement of an inclined beam path 16 at an angle to the supporting surface 3 is advantageous. Initially, the positions of the distinguishing diffraction features, which are to be detected with the laser evaluating unit, can be located roughly on the document during the scanning of the document. In other words, the position of the distinguishing diffraction features are initially noted roughly with the line camera 10 while the surface of the document is being scanned, and verified later with the laser evaluating component mounted on the X slide.

Figure 2:
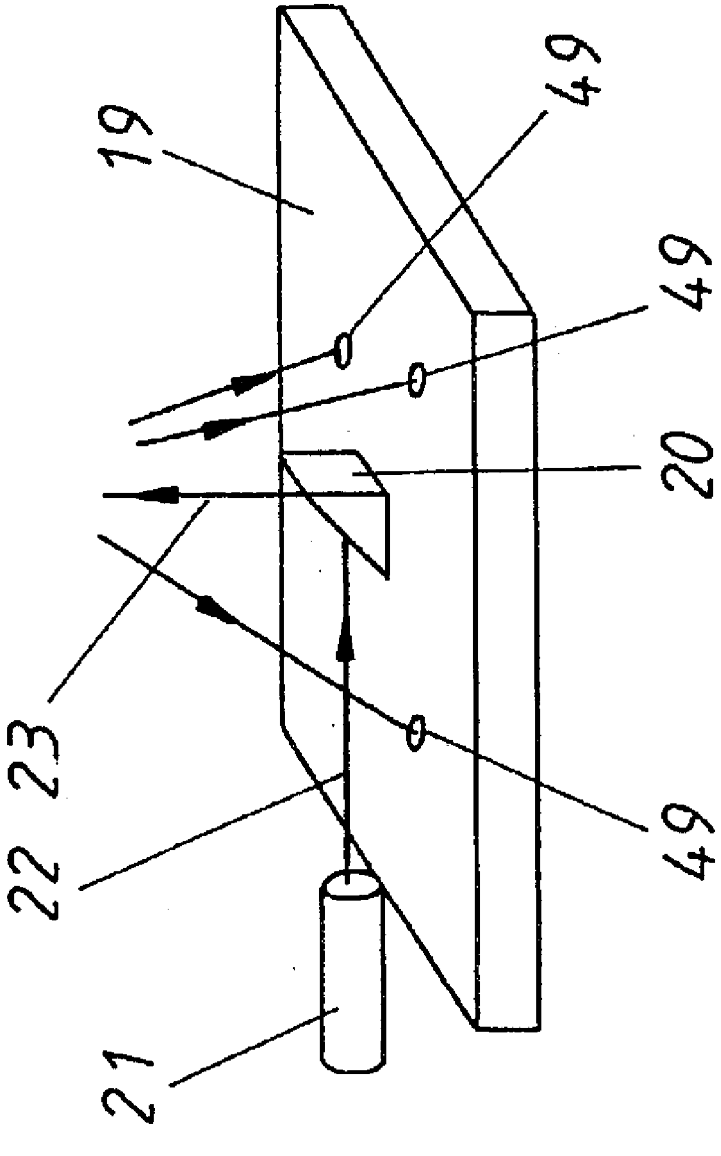
FIG. 2 shows a side view of a laser evaluating unit.

It is preferred that the actual verification of the distinguishing diffraction feature is carried out using the components mounted on the X slide 8. These components consist of a laser 21 which produces a beam 22 (FIG. 2) which is reflected by a tilted mirror 20 as a beam 23 onto the surface of the document to be examined.

It is assumed here that the X-Y slide is positioned precisely below the distinguishing diffraction feature which is to be examined; that is, the X-Y slide has been moved into a precisely fixed X-Y position. FIG. 1 shows only the basic position. In the evaluating position, the X-Y slide is moved to a precisely fixed position which is suitable for evaluating the distinguishing diffraction feature.

The reflected image produced by the distinguishing diffraction feature (i.e., the diffraction pattern) is projected onto a screen, for example, a matt disk 19, forming a diffraction pattern 49 which is viewed through the matt disk 19 from below through a lens 18 within a fixed angle 24 of an OCR matrix camera 17, where it is evaluated. Thus, the entire evaluating unit is a compact unit disposed in a tight space in the X slide 8, and does not easily lose adjustment. U.S. patent application Ser. No. 10/373,884 entitled "Device for Evaluating Diffractive Authenticity Features", filed on Nov. 22, 2002 discloses a device for evaluating a diffraction pattern which is projected onto a matt disk, and that application is hereby incorporated by reference into this specification.

The UV evaluating unit is next described. It is used for evaluating fluorescing distinguishing authenticity features on the surface of a document.

The arrangement as a whole is oriented towards viewing in UV light. A UV flash 26 is equipped with a filter disk 27 which directs light with a high proportion of UV in the direction of arrow 30 onto the surface of the document. The light excites the surface of the document with fluorescing threads which light up characteristically. The light reflected by the document on surface 3 is guided between the limiting beam paths 32, 33 onto the mirror 25, imaged from there through a lens 28 onto a camera 29, and detected by a CCD chip which is situated there.

A UV filter, which blocks UV light, may be placed in front of the lens 28 so that only light from outside of the UV range is detected by the camera. This prevents the UV flash 26 from "blinding" the camera 29.

The mechanical components of the arrangement are described in greater detail with reference to FIGS. 3 to 6.

Figure 6:
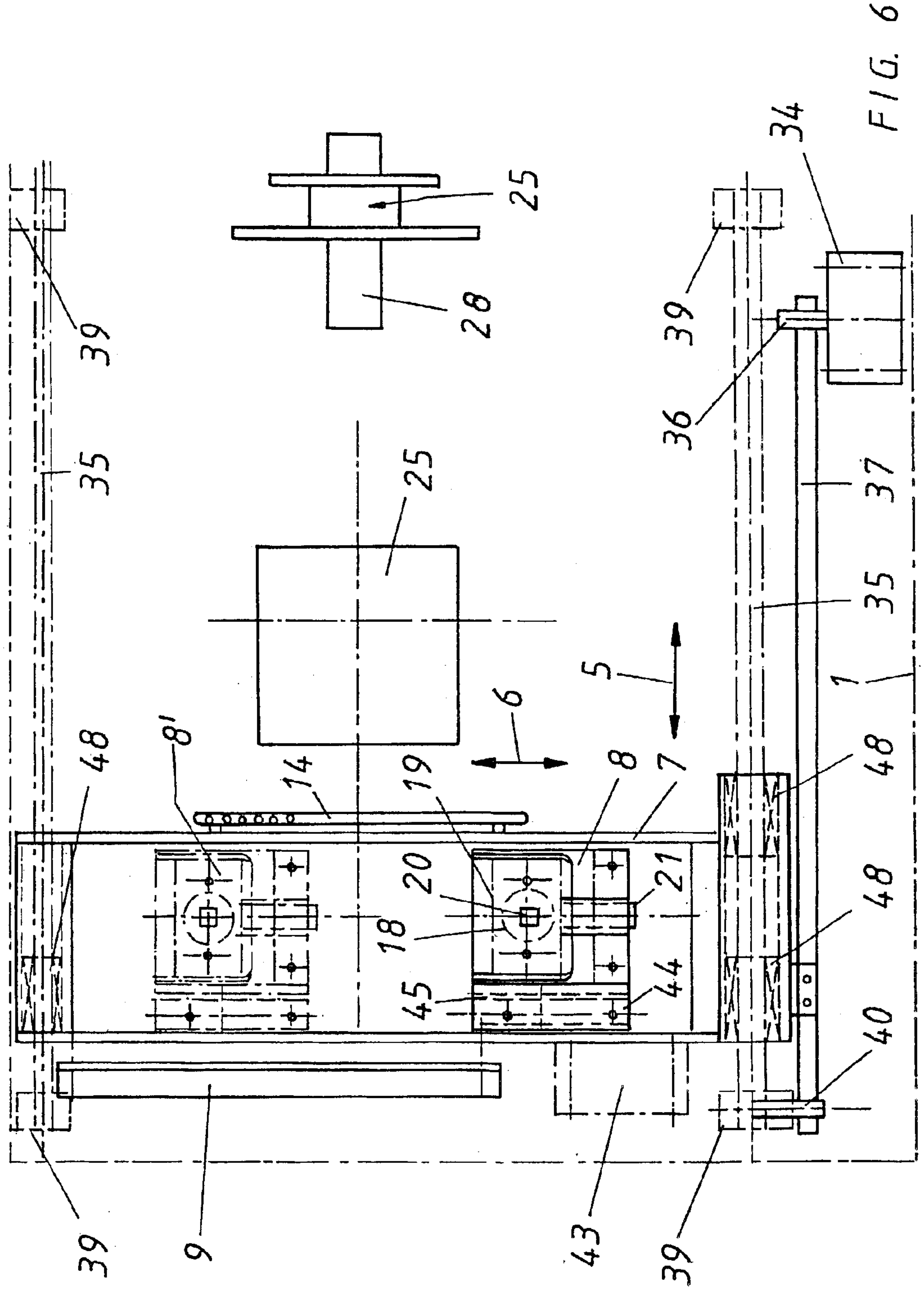
FIG. 6 shows a plan view of the device of FIG. 3 with the X slide in two different positions.

As shown in FIGS. 3 and 6, two elongated guide rails 35 aligned in the Y direction, are mounted parallel to one another and anchored firmly in the housing 1 by supports 39. Two cylindrical bushings 48 (FIG. 6) attached to the Y slide 7 slide on the guide rails 35. The Y slide is thus free to move in a controlled manner in the Y direction as indicated by arrows 5. A stepper motor 34 which is firmly anchored in the housing 1 drives Y slide 7 by means of a cogged belt 37 which engages the motor drive shaft 36 and passes around a diverting pulley 40. One side of the cogged belt is connected to the Y slide 7. In FIG. 6, the connection between the endless belt 37, drive shaft 36 and pulley 40 is shown diagrammatically, the actual arrangement being conventional with drive shaft 36 including suitable means for engaging the belt 37 so that rotation of the belt will drive the Y slide 7 in the directions of arrow 5 (FIG. 6). These elements are best shown in FIG. 3 although, for purposes of clarity, belt 37 is not shown in engagement with pulley 40.

The invention is not limited to an upper guide with upper, parallel guide rails 35; other guiding elements can also be used, such as lower guide rails 35. Instead of four guide bushings 48, more or fewer guide bushings can be used. Indeed, the specific details of the XY slide and the mechanism for controlling its movement form no part of this invention.

A housing 38 is mounted underneath the Y slide. The line camera 10 and the lens 11 are secured in housing 38 so that they can be exchanged easily, and adjusted separately from one another. In other words, because it is mounted in housing 38, camera 10 can be adjusted accurately in the plant with respect to the lens 11 and, later on, the housing 38 can be adjusted accurately with respect to the tilting mirror 12 which is positioned outside of the housing.

The X slide 8 is mounted on the Y slide so that it can be moved perpendicularly to the plane of the drawing of FIG. 3. The X slide 8 moves on a tubular guide 41 on its left side and a slideway 50 on its right side on which the Y slide is seated with a slide block. The tubular guide 41 is secured by two supports 46, which are spaced from one another in the Y slide, as shown in FIG. 5.

Figure 4:
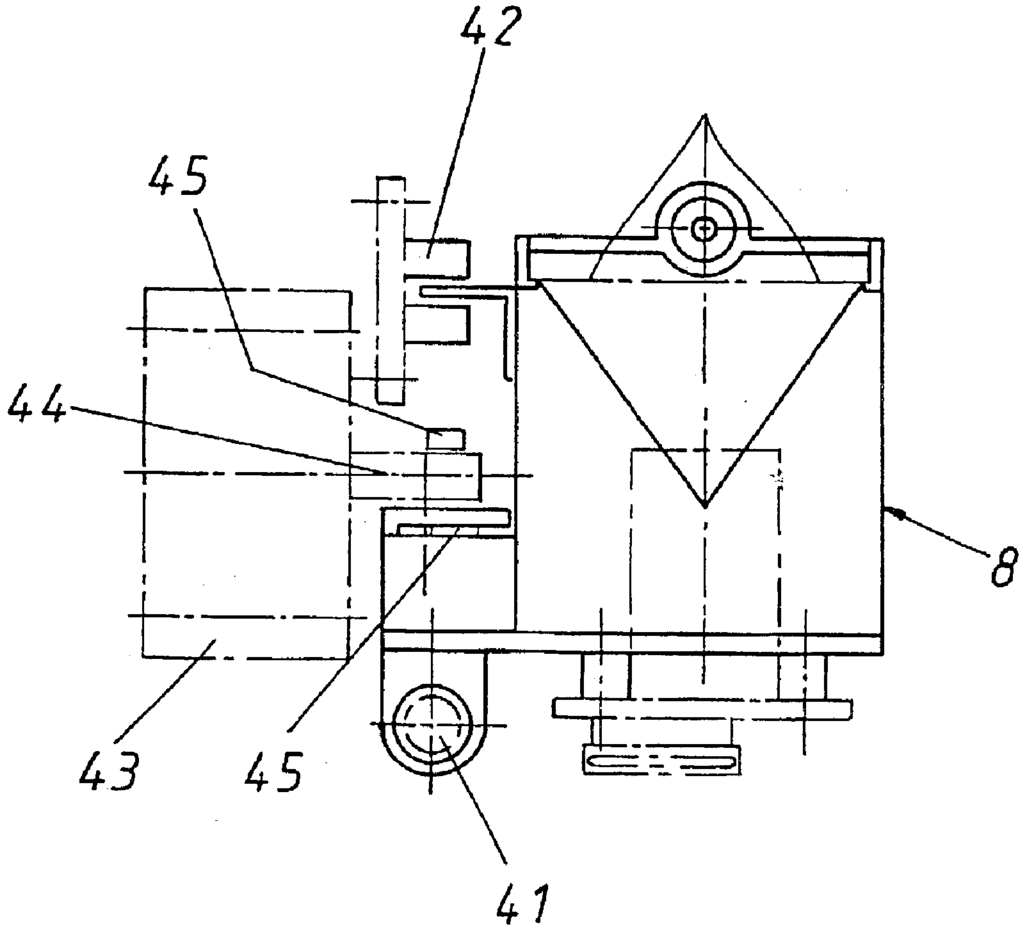
FIG. 4 shows a separate representation of the X slide with its driving mechanism.
Figure 5:
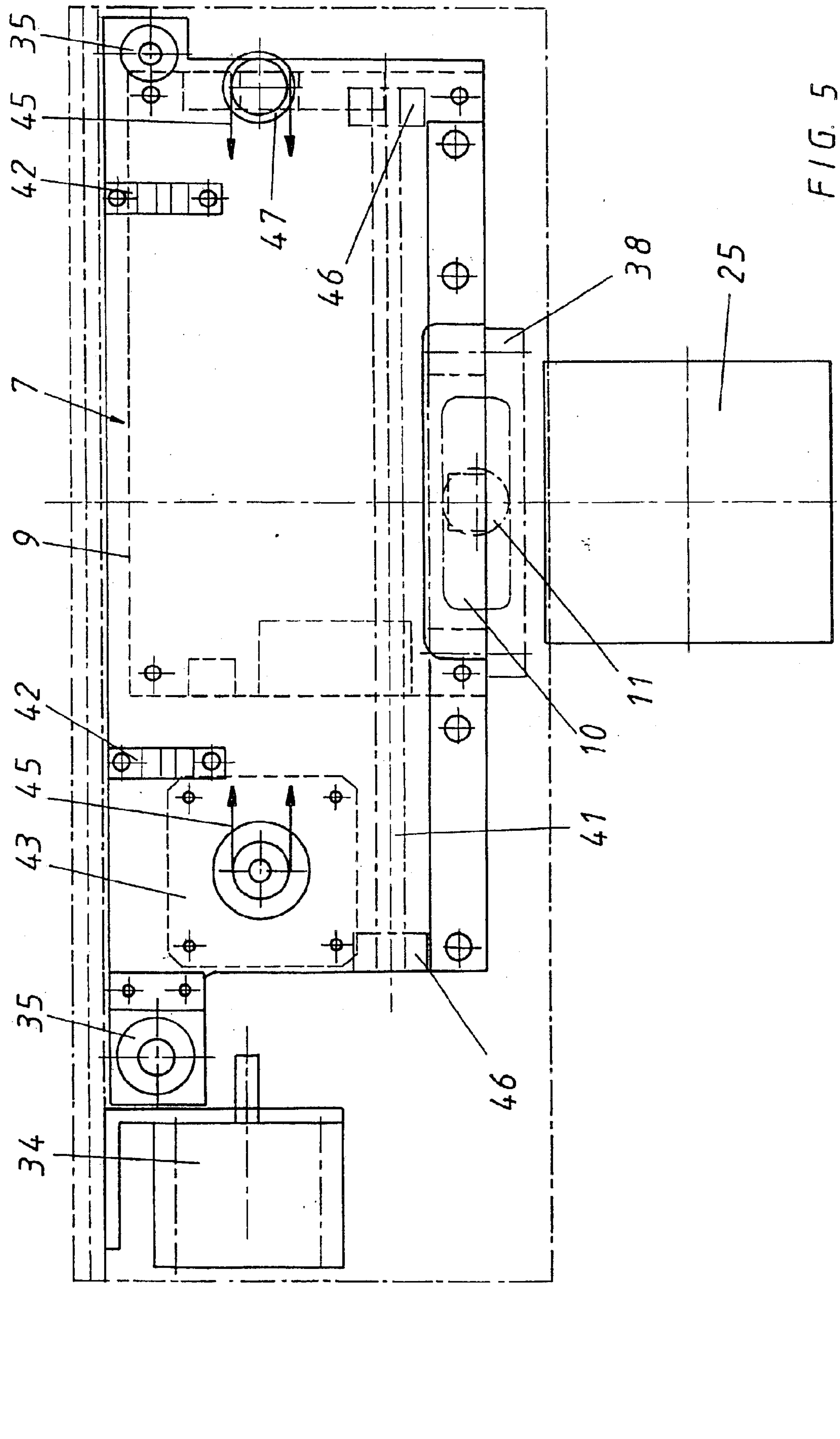
FIG. 5 shows a side view of the Y slide.

For adjusting the end position of the X slide 8 in the Y slide 7, two limit switches 42, which are also shown in FIGS. 4 and 5, are positioned at a distance from one another. The X and Y axes thus each have two limit switches.

The driving motor 43 for the X slide is fastened in the Y slide 7 and drives the X slide 8 in the direction of arrow 6 by means of its drive shaft 44, a cogged belt 45, and a pulley 47 supported in the Y slide. The arrangement of cogged belt 45, drive shaft 44 and pulley 47 is best shown in FIG. 5 wherein belt 45 is shown schematically. For purposes of clarity, belt 45 is only partially illustrated in FIG. 6. Belt 45, of course, can be connected to X-slide 8 in any suitable fashion and the connecting means is not shown in the drawings. The plan view (FIG. 6) shows that the X slide 8 can be moved between two different end positions, the second end position of the X slide being indicated by 8'.

List of Reference Symbols 1. housing
2. front plate
3. supporting surface
4. angle
5. Y direction
6. X direction
7. Y slide
8. X slide
9. signal processing plate
10. line camera
11. lens
12. tilting mirror
13. beam path
14. illuminating unit
15. focusing lens
16. beam path (illumination)
17. OCR matrix camera
18. lens
19. matt disk
20. tilting mirror
21. laser
22. beam path
23. beam path
24. solid angle
25. tilting mirror
26. UV flash
27. filter disk
28. lens
29. matrix camera
30. direction of arrow
31. image
32. beam path
33. beam path
34. stepper motor
35. guide rail
36. drive shaft
37. cogged belt
38. housing
39. support (Y)
40. diverting pulley
41. tubular guide
42. limit switch
43. motor (X)
44. drive shaft
45. cogged belt
46. support (X)
47. diverting pulley (X)

-continued

| List of Reference Symbols |
| --- |
| 48. spherical bushing (Y) |
| 49. diffraction pattern |
| 50. slideway |

What is claimed is:

1. Apparatus for automatically examining secured documents containing at least one diffraction element which creates a predetermined optical diffraction pattern when illuminated with light of a predetermined wavelength, the apparatus comprising:

a supporting surface for supporting a document to be examined;

a compound slide movable in X and Y directions relative to said supporting surface, the compound slide comprising a first slide movable in the X direction and a second slide movable in the Y direction, said first slide being mounted on said second slide;

means for evaluating the diffraction element, said means for evaluating being disposed on said first slide; and means for placing the first and second slides in a predetermined static position.

2. Document-examining apparatus according to claim 1, wherein the means for evaluating the diffraction element comprise a laser and an optical evaluating system for evaluating diffraction elements.

3. Document-examining apparatus according to claim 2, wherein the optical evaluating system comprises an evaluating mirror which follows the beam path of the laser, a screen, a lens an OCR matrix camera.

4. Document-examining apparatus according to claim 1, further including a stationary evaluating unit for evaluating distinguishing fluorescence features of a document, said unit comprising a stationary camera, a mirror which images said supporting surface, and a source of UV radiation for illuminating said supporting surface whereby the light emitted from the document is reflected by the mirror onto the stationary camera.

5. Apparatus for automatically examining secured documents containing at least one diffraction element which creates a predetermined optical diffraction pattern when illuminated with light of a predetermined wavelength, the apparatus comprising:

a supporting surface for supporting a document to be examined;

a compound slide movable in X and Y directions relative to said supporting surface, the compound slide comprising a first slide movable in the X direction and a second slide movable in the Y direction, said first slide being mounted on said second slide;

means for evaluating the diffraction element, said means for evaluating being disposed on said first slide;

second means for evaluating predetermined features of the secured document, said second means being mounted on said second slide; and means for determining a position of a diffraction element on the secured document, prior to evaluation of the diffraction element, said means for determining a position including the second means for evaluating predetermined features of the secured document.

6. Document-examining apparatus according to claim 5, wherein the means for evaluating the diffraction element comprise a laser and an optical evaluating system for evaluating diffraction elements.

7. Document-examining apparatus according to claim 6, wherein the optical evaluating system comprises an evaluating mirror which follows the beam path of the laser, a screen, a lens and an OCR matrix camera.

8. Document-examining device according to claim 5, wherein said second means for evaluating comprises a linear illuminating unit mounted on the second slide.

9. Document-examining apparatus according to claim 5, further including a stationary evaluating unit for evaluating distinguishing fluorescence features of a document, said unit comprising a stationary camera, a mirror which images said supporting surface, and a source of UV radiation for illuminating said supporting surface whereby the light emitted from the document is reflected by the mirror onto the stationary camera.

* * * * *

UNITED STATES PATENT AND TRADEMARK OFFICE

CERTIFICATE OF CORRECTION

PATENT NO. : 6,892,946 B2
DATED : May 17, 2005
INVENTOR(S) : Robert Massen et al.

It is certified that error appears in the above-identified patent and that said Letters Patent is hereby corrected as shown below:

Title page,
Item [76], Inventors, please delete "Thomas Franz, Constance (DE)" and "Thomas Leitner, Constance (DE)" and substitute therefor -- Thomas Franz, Konstanz (DE) -- and -- Thomas Leitner, Konstanz (DE) --.

Signed and Sealed this

Ninth Day of August, 2005

JON W. DUDAS
*Director of the United States Patent and Trademark Office*